UNITED STATES PATENT OFFICE.

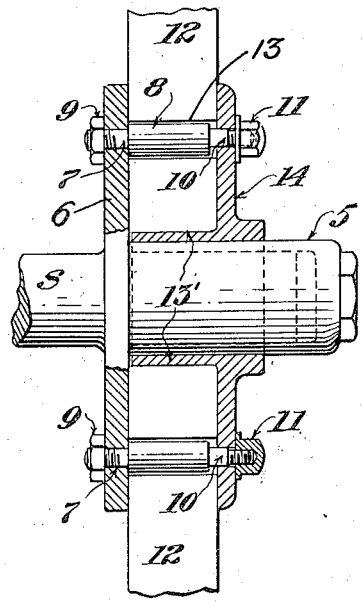
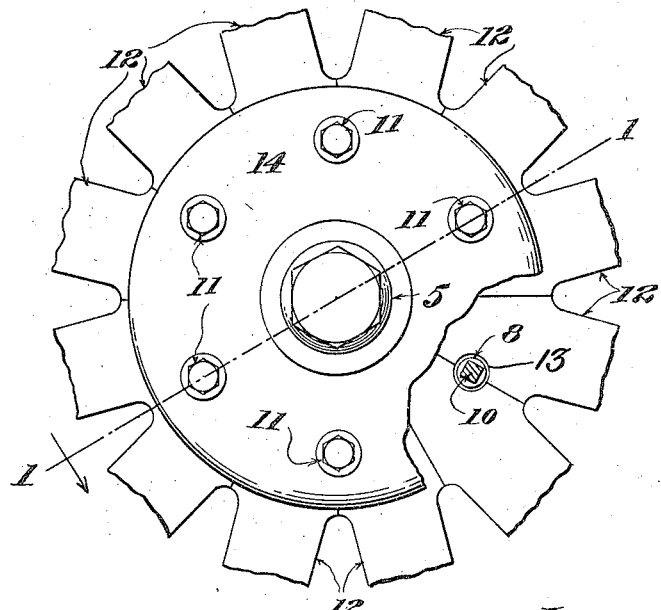

WILLIAM H. J. FITZGERALD, OF BRAINTREE, MASSACHUSETTS, ASSIGNOR TO E-Z RIM COMPANY, A CORPORATION OF MASSACHUSETTS.

DEMOUNTABLE WHEEL.

1,110,764.  Specification of Letters Patent.  Patented Sept. 15, 1914.

Application filed April 22, 1914.  Serial No. 833,767.

*To all whom it may concern:*

Be it known that I, WILLIAM H. J. FITZGERALD, a citizen of the United States, residing at Braintree, in the county of Norfolk and State of Massachusetts, have invented certain new and useful Improvements in Demountable Wheels, of which the following is a specification, reference being had to the accompanying drawings, forming part thereof.

This invention has reference to improvements in wheels demountably attached to hubs whereby the wheels with the tires thereon may be removed and demounted from the hubs and replaced by other similar wheels having inflated tires.

The object of the invention is to improve the construction of demountable wheels relative to the means for attaching the wheels to the hubs.

Other objects of the invention will appear from the following description.

The invention consists in the demountable wheel hereinafter described and claimed.

Figure 1, represents a cross sectional view of a demountable wheel taken on line 1—1 Fig. 2, illustrating my invention. Fig. 2, represents a face view of the clamping and sustaining member for the wheel spokes, also showing portions of said spokes in position, part of said clamping plate being broken away to show the manner in which the studs are engaged with the spokes.

Similar characters of reference designate corresponding parts throughout.

In carrying this invention into practice I take the hub 5 having the flange 6 rotatably mounted on the axle or spindle S and adapted to be secured in any ordinary manner to rotate on said axle or spindle S. The flange 6 has a series of transverse perforations in which are secured the contracted stud members 7, 7 having the enlarged portions 8, 8 forming shoulders bearing against the flange 6. The stud members 7, 7 are secured in the perforations of the flange 6 by means of the nuts 9, 9 or in any other suitable manner so that said studs are fixedly secured in position. The outer ends of the stud enlargements 8, 8 have the contracted portions 10, 10 rectangular in shape for a portion of their length and having screw threaded ends adapted to receive the nuts 11, 11.

The meeting faces of the spokes 12, 12 have perforations 13, 13 adapted to be freely received on the enlargements 8, 8 of the studs, and it is noticed in Fig. 1 that the spokes 12, 12, have a thickness slightly exceeding the length of said stud enlargements 8, 8 so that when the spokes are engaged with such enlargements, the outer faces of the spokes extend in planes slightly offset from the outer ends of said enlargements 8, 8.

The inner ends of the spokes 12, 12 are received and frictionally engaged by the collar 13', of the clamping plate 14, which plate is adapted to be received by the hub 5 and has a series of rectangular perforations adapted to receive the rectangular portions of the stud members 10, 10. The demountable wheel includes the spokes 12, 12 and the collar 13 with its flange 14 so that when the nuts 11, 11 are removed from the stud members the spokes 12, 12 with the clamping plate 14 and the collar 13' may be readily removed and replaced by a similar wheel having the perforations 13, 13 adapted to be received by the stud enlargements 8, 8. When such wheel is in place the nuts 11, 11 are screwed onto the several stud members 10, 10 and the clamping plate 14 is brought to bear against the outer faces of all the spokes, thus to some extent exerting a pressure on all of the spokes, this being permitted by the fact that the enlargements 8, 8 of the stud members and the collar 13' are shorter than the diameter of the spokes.

By the use of the rectangular portions of the stud members 10, 10 the nuts 11, 11 may be screwed tightly into position without tendency of effecting the rotation of the studs and the loosening of the same in any way from the nuts 9, 9.

Having thus described my invention I claim as new and desire to secure by Letters Patent.

A demountable wheel comprising a hub having a flange, a series of shouldered bolts fixed in said flange and having reduced outer members screw threaded at their ends and rectangular between the screw threads and the enlargements, in combination with a wheel having a series of spokes furnished with perforations adapted to be received on said studs, a collar to receive the ends of said spokes furnished with a flange having rectangular perforations to receive the rectangular portions of said stud members, and a series of nuts adapted to be screwed onto the said stud members.

WILLIAM H. J. FITZGERALD.

Witnesses:
HENRY J. MILLER,
ESTHER C. MURPHY.